United States Patent
Lin et al.

(10) Patent No.: US 11,557,144 B2
(45) Date of Patent: Jan. 17, 2023

(54) CAPACITIVE FINGERPRINT SENSING DEVICE

(71) Applicant: Egis Technology Inc., Hsinchu (TW)

(72) Inventors: Yu-Hsuan Lin, Hsinchu (TW);
Chung-Yi Wang, Hsinchu (TW);
Zhe-Wei Kuo, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/467,459

(22) Filed: Sep. 7, 2021

(65) Prior Publication Data

US 2022/0100984 A1 Mar. 31, 2022

Related U.S. Application Data

(60) Provisional application No. 63/085,129, filed on Sep. 29, 2020.

(51) Int. Cl.
*G06V 40/13* (2022.01)

(52) U.S. Cl.
CPC .................... *G06V 40/13* (2022.01)

(58) Field of Classification Search
None
See application file for complete search history.

(56) References Cited

U.S. PATENT DOCUMENTS

| | | | |
|---|---|---|---|
| 6,438,257 B1* | 8/2002 | Morimura | G06V 40/1306 382/125 |
| 2019/0237591 A1* | 8/2019 | Cheng | H01L 31/10 |

FOREIGN PATENT DOCUMENTS

| | | |
|---|---|---|
| CN | 104282265 | 1/2015 |
| CN | 107818297 | 3/2018 |
| TW | 201211868 | 3/2012 |
| TW | I448950 | 8/2014 |

OTHER PUBLICATIONS

"Office Action of Taiwan Counterpart Application", dated Nov. 8, 2022, pp. 1-6.

\* cited by examiner

*Primary Examiner* — Nicholas J Lee
(74) *Attorney, Agent, or Firm* — JCIPRNET

(57) ABSTRACT

A capacitive fingerprint sensing device is provided. A sensing pixel unit includes a capacitor, a reset circuit, and a sensing capacitor. The reset circuit provides a reset voltage during a reset period to reset a voltage on the capacitor and provides an adjustment current during a sensing period to adjust a sense voltage generated on a common junction of the capacitor and the reset circuit.

8 Claims, 4 Drawing Sheets

CAPACITIVE FINGERPRINT SENSING DEVICE

CROSS-REFERENCE TO RELATED APPLICATION

This application claims the priority benefits of U.S. provisional application Ser. No. 63/085,129, filed on Sep. 29, 2020. The entirety of each of the above-mentioned patent applications is hereby incorporated by reference herein and made a part of this specification.

BACKGROUND

Technical Field

The disclosure relates to a sensing device, and more particularly to a capacitive fingerprint sensing device.

Description of Related Art

Nowadays, fingerprint recognition is widely applied in various electronic products, and portable mobile devices such as mobile phones and tablet computers are the most common. In the application of fingerprint recognition in smart phones, common fingerprint recognition devices can be divided into optical, capacitive, ultrasonic devices, and the like. Among these devices, capacitive fingerprint recognition devices are the mainstream.

Fingerprint sensors obtain the fingerprint image of a finger by detecting the capacitance between the sensing electrode and the finger. For example, a fingerprint sensor can obtain the fingerprint image of the finger based on the capacitance between the sensing electrodes included in the sensing pixel where the finger and the ridge of the fingerprint are located and the capacitance between the sensing electrodes included in the sensing pixel where the finger and the valley of the fingerprint are located. Generally speaking, to be able to recognize fingerprints, the captured image must be of high resolution, and the resolution of the captured image is related to the size of the sensing pixel.

SUMMARY

The disclosure provides a capacitive fingerprint sensing device capable of providing fingerprint images of high resolution.

The capacitive fingerprint sensing device of the disclosure includes a sensing pixel unit and a buffer amplifier circuit. A first terminal of the capacitor is coupled to a bias voltage. The reset circuit is coupled to a second terminal of the capacitor. The sensing capacitor is formed between a common junction of the capacitor and the reset circuit and the finger in response to a fingerprint sensing operation of a finger. The reset circuit provides a reset voltage to reset a voltage on the capacitor during a reset period and provides an adjustment current during a sensing period to adjust a sensing voltage generated on the common junction of the capacitor and the reset circuit. The buffer amplifier circuit is coupled to the sensing pixel unit and amplifies the sensing voltage to generate an output voltage.

In summary, the sensing pixel unit in the embodiments of the disclosure includes a capacitor, a reset circuit, and a sensing capacitor. The reset circuit provides a reset voltage during a reset period to reset a voltage on the capacitor and provides an adjustment current during a sensing period to adjust a sensing voltage generated on the common junction of the capacitor and the reset circuit. Accordingly, the capacitive fingerprint sensing device can improve fingerprint sensing efficiency while providing fingerprint images of high resolution.

DESCRIPTION OF THE EMBODIMENTS

Figure 1:
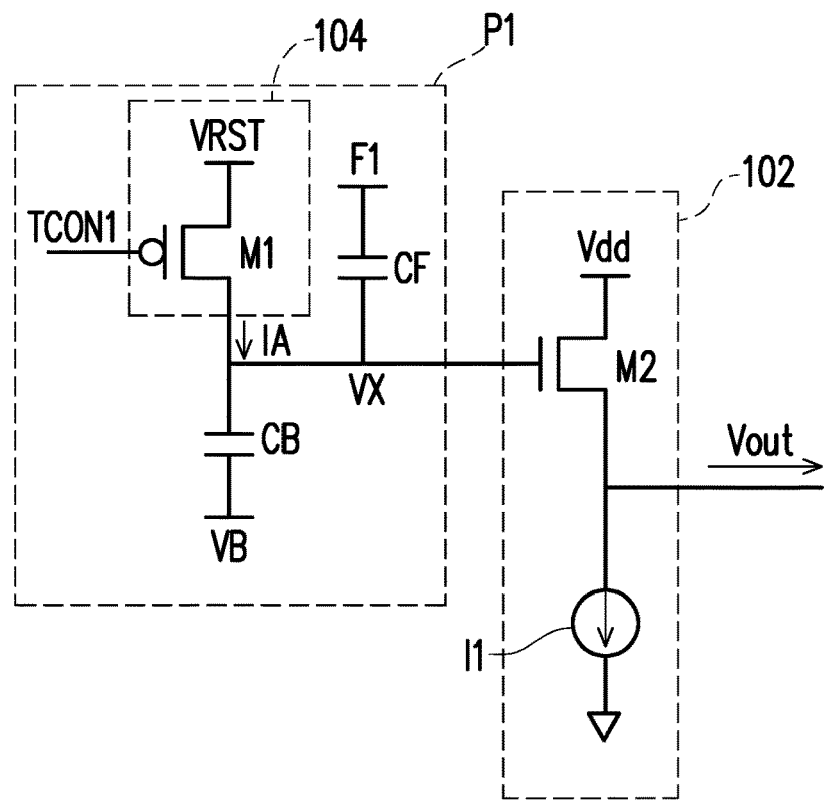
FIG. 1 is a schematic view of a capacitive fingerprint sensing device according to an embodiment of the disclosure.

In order to make the content of the disclosure more comprehensible, the following embodiments are specifically cited as examples on which the disclosure can indeed be implemented. In addition, wherever possible, elements/components with the same reference numbers in the drawings and embodiments represent the same or similar components.

FIG. 1 is a schematic view of a capacitive fingerprint sensing device according to an embodiment of the disclosure. Referring to FIG. 1, the capacitive fingerprint sensing device may include a sensing pixel unit P1 and a buffer amplifier circuit 102. The sensing pixel unit P1 includes a capacitor CB, a reset circuit 104, and a sensing capacitor CF. The capacitor CB is coupled between the reset circuit 104 and a bias voltage VB, the common junction point of the reset circuit 104 and the capacitor CB is coupled to an input terminal of the buffer amplifier circuit 102, and the sensing capacitor CF is formed between the common junction point of the capacitor CB and the reset circuit 104 and a finger F1 in response to the fingerprint sensing operation of the finger F1.

The reset circuit 104 can provide a reset voltage VRST to reset the voltage on the capacitor CB during the reset period, provide an adjustment current IA during the sensing period to charge the capacitor CB and the sensing capacitor CF, and adjust a sensing voltage VX generated on the common junction of the capacitor CB and the reset circuit 104. The buffer amplifier circuit 102 can amplify the sensing voltage VX to generate an output voltage Vout for the subsequent signal processing circuit to process the fingerprint image signal.

Accordingly, in the embodiment, a simple circuit structure is adopted to implement the sensing pixel unit P1. The reset circuit 104 of the sensing pixel unit P1 provides a reset voltage VRST during the reset period to reset the voltage on the capacitor, and during the sensing period, an adjustment current IA is provided to adjust the sensing voltage VX generated on the common junction of the capacitor CB and the reset circuit 104. This can effectively reduce the circuit area of the sensing pixel unit P1, provide fingerprint images of high resolution, and improve the efficiency of fingerprint sensing.

Furthermore, in the embodiment, the reset circuit 104 can be implemented by a transistor M1, but the disclosure is not limited thereto. The transistor M1 is a P-type transistor. The transistor M1 is coupled between the reset voltage VRST and the capacitor CB, and the conduction state of the transistor M1 is controlled by a control signal TCON1. The buffer amplifier circuit 102 may include a transistor M2 and a current source I1. The transistor M2 is coupled between a power supply voltage Vdd and the output terminal of the buffer amplifier circuit 102. The control terminal of the transistor M2 is coupled to the output terminal of the sensing pixel unit P1. The current source I1 is coupled between the output terminal of the buffer amplifier circuit 102 and the ground.

Figure 2:
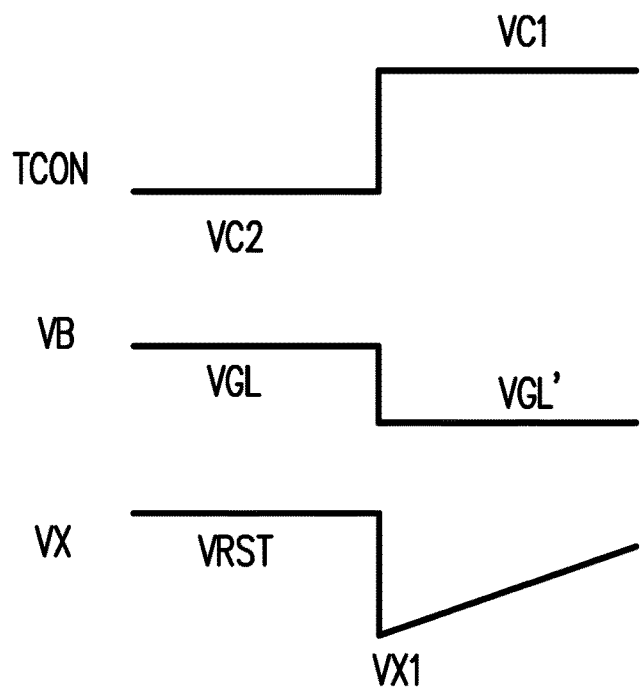
FIG. 2 is an operation timing diagram of a capacitive fingerprint sensing device according to an embodiment of the disclosure.

As shown in FIG. 2, during the reset period, the voltage value of the control signal TCON1 is a voltage VC2, and the transistor M1 is in the conduction state. Meanwhile, the reset voltage VRST can reset the voltage of the capacitor CB through the transistor M1, so that the voltage value of the sensing voltage VX on the capacitor CB is equal to the reset voltage VRST. The voltage value of the bias voltage VB during the reset period is a voltage VGL, which can be a ground voltage, for example, but the disclosure is not limited thereto. During the sensing period, the voltage value of the control signal TCON1 is converted to a voltage VC1 (the voltage VC1 is less than the reset voltage VRST) with a higher voltage level, and the bias voltage VB is converted to a voltage VGL' with a lower voltage level, so that the transistor M1 can provide the adjustment current IA to charge the capacitor CB and the sensing capacitor CF. The relationship among the reset voltage VRST, the bias voltage VB, and the sensing voltage VX can be expressed as follows.

$$VX = VRST - \frac{CB}{CB+CF1} \times VGL' \quad (1)$$

Furthermore, if the capacitance value of the sensing capacitor CF corresponding to a fingerprint peak is CF1, the capacitance value of the sensing capacitor CF corresponding to the fingerprint valley is CF1+ΔC, and the time for the adjustment current IA to charge the capacitor CB and the sensing capacitor CF is Δt, the sensing voltage VH corresponding to the fingerprint peak and the sensing voltage VL corresponding to the fingerprint valley respectively can be shown as follows.

$$VH = VRST - \frac{CB}{CB+CF1} \times VGL' + \frac{I \times \Delta t}{CB+CF1} \quad (2)$$

$$VL = VRST - \frac{CB}{CB+CF1+\Delta C} \times VGL' + \frac{I \times \Delta t}{CB+CF1+\Delta C} \quad (3)$$

During the signal output period of the sensing pixel unit P1, the bias voltage VB can be pulled high to assist the conduction of the transistor M2. The sensing voltage VH and the sensing voltage VL can be converted into the output voltage Vout through a source follower including the transistor M2 and the current source I1, and output to the subsequent signal processing circuit to process the fingerprint image signal.

Figure 3:
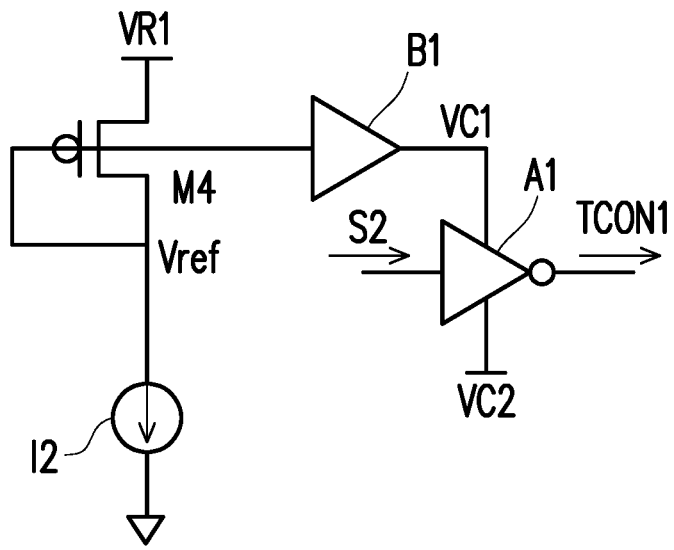
FIG. 3 is a schematic view of a control signal generating circuit according to an embodiment of the disclosure.

Specifically, the control signal TCON1 can be generated by the control signal generating circuit shown in FIG. 3, for example. The control signal generating circuit may include a P-type transistor M4, a current source I2, a buffer B1, and an inverter A1. The P-type transistor M4 is coupled between a reference voltage VR1 and the current source I2, the gate and drain of the P-type transistor M4 are coupled to each other, and the current source I2 is coupled between the drain of the P-type transistor M4 and the ground. The input terminal and output terminal of the buffer B1 are respectively coupled to the gate of the P-type transistor M4 and the first power input terminal of the inverter A1. The second power input terminal of the inverter A1 is coupled to another reference voltage (the voltage VC2 is illustrated in the embodiment), the output terminal of the inverter A1 is coupled to the gate of the transistor M1, and the input terminal of the inverter A1 receives a clock control signal S1.

Furthermore, at the drain of the P-type transistor M4, a voltage Vref can be generated in response to the current of the current source I2. The voltage Vref can be output to the first power input terminal of the inverter A1 through the gate of the P-type transistor M4 and the buffer B1. In the embodiment, for example, the voltage Vref can be designed to be equal to the voltage VC1 in the embodiment of FIG. 1, but the disclosure is not limited thereto. The inverter A1 can be controlled by the clock control signal S1 to output the control signal TCON1 to provide a control signal TCON1 with a voltage value of the voltage VC2 during the reset period and provide a control signal TCON1 with a voltage value of the voltage VC1 during the sensing period. The design of the control signal generating circuit of the embodiment allows the current value of the current source I2 equal to the adjustment current IA provided by the transistor M1 (reset circuit 104) during the sensing period, and the current adjustment can be performed in a more intuitive and convenient way.

Figure 4:
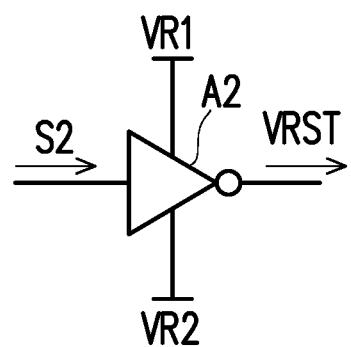
FIG. 4 is a schematic view of a reset voltage generating circuit according to an embodiment of the disclosure.

Note that in some embodiments, the reset voltage VRST coupled to the reset circuit 104 can also be changed so that the reset circuit 104 provides the adjustment current IA during the sensing period. For example, the reset voltage VRST may be provided by the reset voltage generating circuit shown in FIG. 4, and the reset voltage generating circuit may include an inverter A2. The first power terminal and the second power terminal are respectively coupled to the reference voltage VR1 and the reference voltage VR2, the output terminal of the inverter A2 is coupled to the transistor M1 to provide the reset voltage VRST, and the input terminal of the inverter A1 receives a clock control signal S2, the reference voltage VR1 is greater than the reference voltage VR2. The inverter A2 can be controlled by the clock control signal S2 to output the control signal VRST to provide a reset voltage VRST with a voltage value equal to the reference voltage VR2 during the reset period and to provide a reset voltage VRST with a voltage value equal to the reference voltage VR1 during the sensing period.

Figure 5:
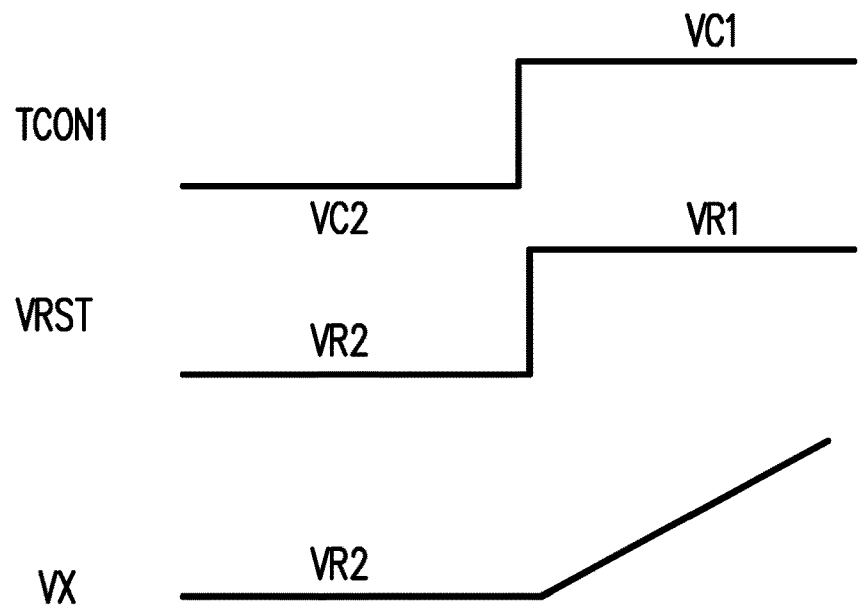
FIG. 5 is an operation timing diagram of a capacitive fingerprint sensing device according to another embodiment of the disclosure.

As shown in FIG. 5, during the reset period, the voltage value of the control signal TCON1 is the voltage VC2, and the transistor M1 is in the conduction state. Meanwhile, the reset voltage VRST (the voltage value equal to the reference voltage VR2) provided by the reset voltage generating circuit can reset the capacitor CB through the transistor M1, so that the voltage value of the sensing voltage VX on the capacitor CB is equal to the reference voltage VR2. During the sensing period, the voltage value of the control signal TCON1 is converted to a voltage VC1 with a higher voltage level. With the voltage difference between the reset voltage VRST (the voltage value equal to the reference voltage VR1) provided by the reset voltage generating circuit and the bias voltage VB, the transistor M1 can provide the adjustment current IA to charge the capacitor CB and the sensing capacitor CF, and the sensing voltage VX gradually rises with time. For example, the subsequent signal processing circuit coupled to the buffer amplifier circuit 102 can determine the capacitance value of the sensing capacitor CF according to the time required for the sensing voltage VX to rise to the preset voltage, and the content of the fingerprint image can be further acquired. Alternatively, the capacitance value of the sensing capacitor CF can be determined from the voltage value of the sensing voltage VX after the sensing period ends, so as to acquire the content of the fingerprint image.

Figure 6:
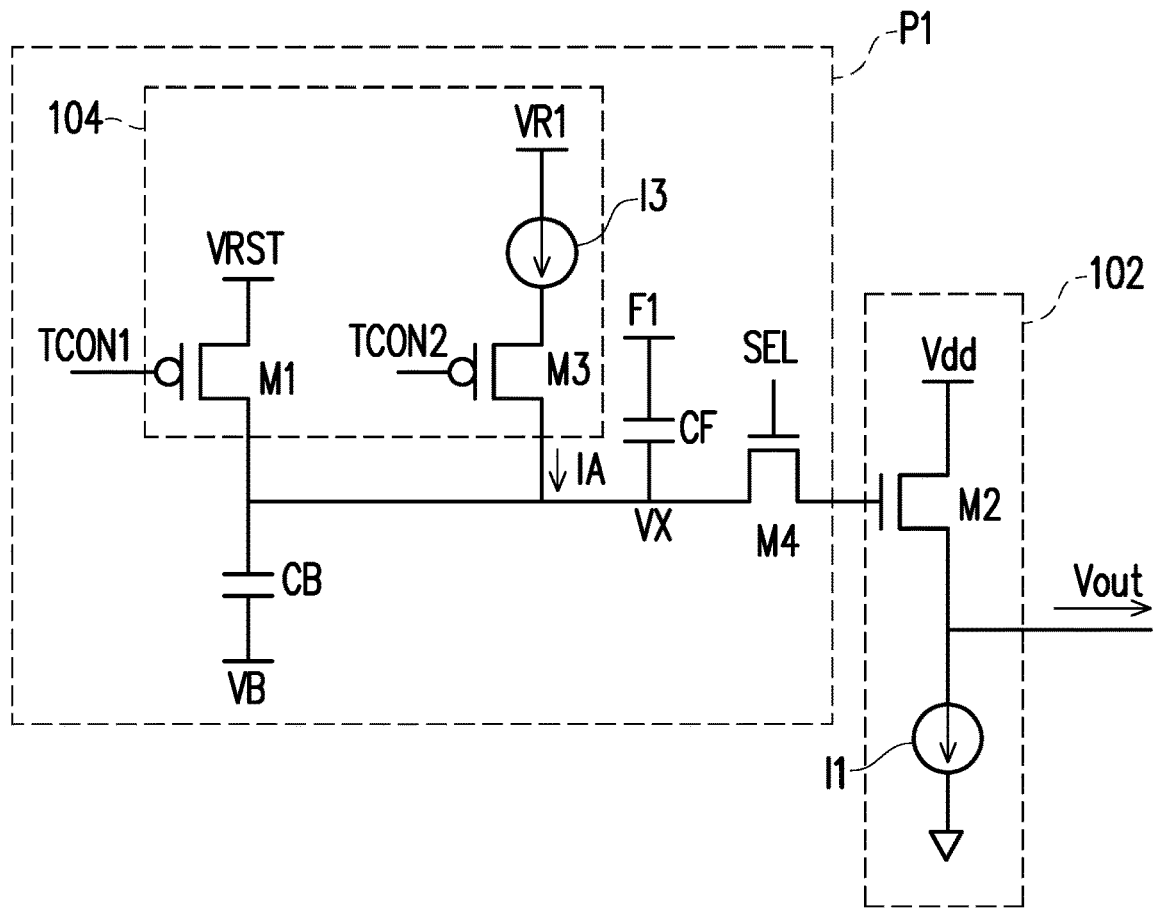
FIG. 6 is a schematic view of a capacitive fingerprint sensing device according to another embodiment of the disclosure.
Figure 7:
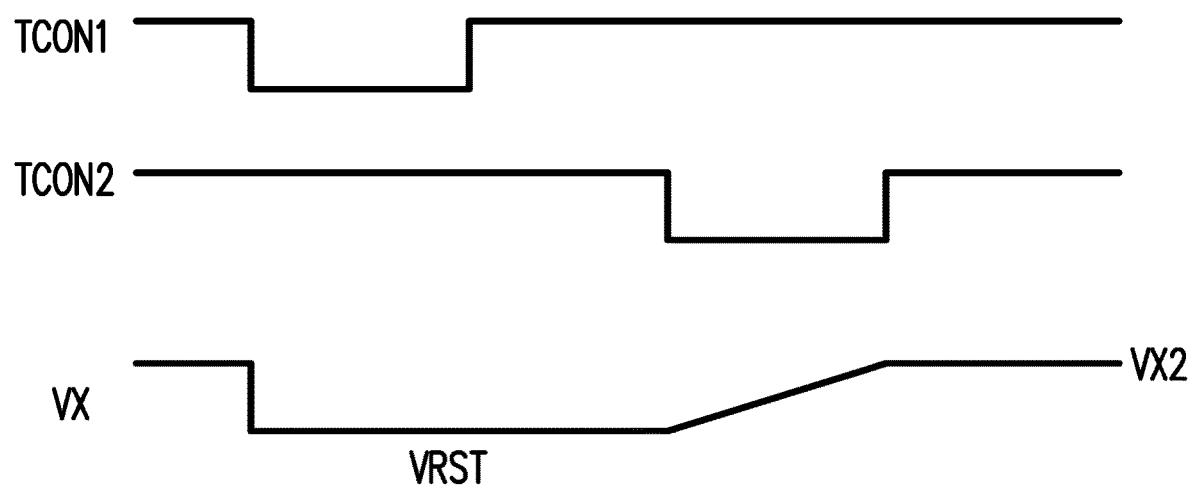
FIG. 7 is an operation timing diagram of a capacitive fingerprint sensing device according to another embodiment of the disclosure.

FIG. 6 is a schematic view of a capacitive fingerprint sensing device according to another embodiment of the disclosure, compared with the embodiment in FIG. 1. The reset circuit 104 of the embodiment of FIG. 6 may further include a transistor M3 and a current source I3. Moreover, the sensing pixel unit P1 may further include a selected transistor M4, the current source I3 and the transistor M3 are connected in series between the common junction of the reference voltage VR1 and the transistor M1 and the capacitor CB, and the selected transistor M4 is coupled to the common junction of the transistor M1 and the capacitor CB and the gate of the transistor M2. The reference voltage VR1 is greater than the reset voltage VRST. In the embodiment, the conduction states of the transistors M1 and M3 are controlled by the control signals TCON1 and TCON2, respectively, as shown in FIG. 7. During the reset period, the control signal TCON1 is at a low voltage level to turn on the transistor M1, the voltage value of the sensing voltage VX is reset to the reset voltage VRST, the control signal TCON1 is at a high voltage level, and the transistor M3 is in an off state. During the sensing period, the control signal TCON1 is at a high voltage level, the transistor M1 is in an off state, the control signal TCON2 is at a low voltage level, and the transistor M3 is turned on. Therefore, the current source I3 can provide an adjustment current IA to charge the capacitor CB and the sensing capacitor CF. In the embodiment, the voltage value of the sensing voltage VX is charged to the voltage VX2 during the sensing period. Moreover, the selected transistor M4 can be controlled by the selection signal to enter the conduction state during the signal output period of the sensing pixel unit P1, so as to output the sensing voltage VX to the buffer amplifier circuit 102, the buffer amplifier circuit 102 generates the output voltage Vout according to the sensing voltage VX to the subsequent signal processing circuit to process the fingerprint image signal. During the signal output period, the voltage value of the bias voltage VB can be pulled up to assist the conduction of the transistor M2 and convert the sensing voltage VX into the output voltage Vout.

In summary, the sensing pixel unit with a simple circuit structure is implemented in the embodiments of the disclosure. The sensing pixel unit may include a capacitor, a reset circuit, and a sensing capacitor. The reset circuit can provide a reset voltage to rest the voltage on the capacitor during the reset period and provide an adjustment current during the sensing period to adjust the sensing voltage generated on the common junction of the capacitor and the reset circuit. Accordingly, the capacitive fingerprint sensing device can improve fingerprint sensing efficiency while providing fingerprint images of high resolution.

What is claimed is:

1. A capacitive fingerprint sensing device, comprising:
a sensing pixel unit, comprising:
a capacitor, wherein a first terminal of which is coupled to a bias voltage;
a reset circuit coupled to a second terminal of the capacitor; and
a sensing capacitor formed between a common junction of the capacitor and the reset circuit and the finger in response to a fingerprint sensing operation of a finger, wherein the reset circuit provides a reset voltage to reset a voltage on the capacitor during a reset period and provides an adjustment current during a sensing period to adjust a sensing voltage generated on the common junction of the capacitor and the reset circuit; and
a buffer amplifier circuit coupled to the sensing pixel unit and amplifying the sensing voltage to generate an output voltage,
wherein the reset circuit comprises a first transistor coupled between the reset voltage and the second terminal of the capacitor and controlled by a control signal to provide the reset voltage during the reset period and provide the adjustment current during the sensing period,
wherein the bias voltage is converted from a first bias voltage to a second bias voltage when entering a signal output period to turn on the first transistor.

2. The capacitive fingerprint sensing device according to claim 1, further comprising:
a control signal generating circuit coupled to the control terminal of the first transistor to generate the control signal, wherein the control signal generating circuit comprises:
a P-type transistor, wherein a source terminal of the P-type transistor is coupled to a first reference voltage, and a drain and a gate of the P-type transistor are coupled to each other;
a current source coupled between the drain of the P-type transistor and a ground;
a buffer coupled to the gate of the P-type transistor and outputting a first voltage according to a gate voltage of the P-type transistor; and
an inverter, wherein a first power input terminal of the inverter is coupled to an output terminal of the buffer, and a second power input terminal of the inverter is coupled to a second voltage, the inverter is controlled by a clock control signal to output the second voltage during the reset period and output the first voltage during the sensing period to control the first transistor to provide the reset voltage during the reset period and provide the adjustment current during the sensing period.

3. The capacitive fingerprint sensing device according to claim 2, wherein the reset voltage is greater than the first voltage.

4. The capacitive fingerprint sensing device according to claim 1, wherein the reset voltage has a first voltage value during the sensing period and has a second voltage value during the reset period, and the first voltage value is greater than the second voltage value.

5. The capacitive fingerprint sensing device according to claim 4, further comprising:
a reset voltage generating circuit coupled to the first transistor to generate the reset voltage, and the reset voltage generating circuit comprises:

an inverter, wherein a first power input terminal of the inverter is coupled to a first reference voltage, a second power input terminal of the inverter is coupled to a second reference voltage, and the inverter is controlled by a clock control signal to output the first reference voltage during the sensing period and output the second reference voltage during the reset period, wherein the first reference voltage has the first voltage value, and the second reference voltage has the second voltage value.

6. A capacitive fingerprint sensing device, comprising:
a sensing pixel unit, comprising:
a capacitor, wherein a first terminal of which is coupled to a bias voltage;
a reset circuit coupled to a second terminal of the capacitor; and
a sensing capacitor formed between a common junction of the capacitor and the reset circuit and the finger in response to a fingerprint sensing operation of a finger, wherein the reset circuit provides a reset voltage to reset a voltage on the capacitor during a reset period and provides an adjustment current during a sensing period to adjust a sensing voltage generated on the common junction of the capacitor and the reset circuit; and
a buffer amplifier circuit coupled to the sensing pixel unit and amplifying the sensing voltage to generate an output voltage, wherein the reset circuit comprises:
a first transistor coupled between the reset voltage and the second terminal of the capacitor, controlled by a first control signal to provide the reset voltage during the reset period, and turned off during the sensing period
a current source; and
a second transistor coupled to the current source between a reference voltage and a common junction of the capacitor and the reset circuit and controlled by a second control signal to provide the adjustment current during the sensing period, wherein the reference voltage is greater than the reset voltage.

7. The capacitive fingerprint sensing device according to claim 1, wherein the buffer amplifier circuit comprises:
a second transistor, wherein a first terminal of the second transistor is coupled to a power supply voltage, a second terminal of the second transistor is coupled to an output terminal of the buffer amplifier circuit, and a control terminal of the second transistor is coupled to an output terminal of the sensing pixel unit; and
a current source is coupled between the second terminal of the second transistor and the ground.

8. The capacitive fingerprint sensing device according to claim 1, further comprising:
a selection transistor coupled between the common junction of the capacitor and the reset circuit and the buffer amplifier circuit and controlled by a selection signal to be turned on during a signal output period.

* * * * *